Figure 1:
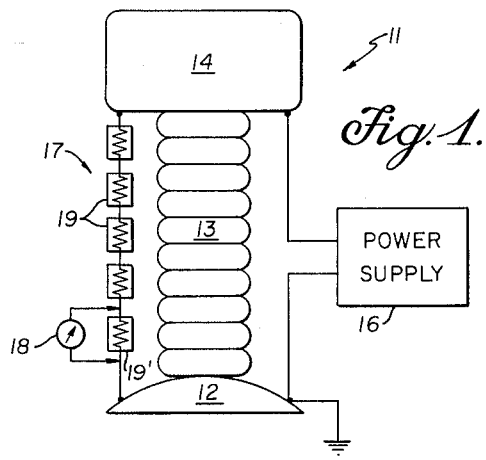

March 8, 1966     T. W. SIBARY     3,239,751
HIGH VOLTAGE RESISTOR ASSEMBLY HAVING IMPROVED
CORONA SHIELDING
Filed Aug. 21, 1963

INVENTOR.
THOMAS W. SIBARY
BY
ATTORNEY.

United States Patent Office 3,239,751
Patented Mar. 8, 1966

3,239,751
HIGH VOLTAGE RESISTOR ASSEMBLY HAVING IMPROVED CORONA SHIELDING
Thomas W. Sibary, Orinda, Calif., assignor to The United States of America as represented by the United States Atomic Energy Commission
Filed Aug. 21, 1963, Ser. No. 303,693
7 Claims. (Cl. 323—74)

The present invention relates generally to high voltage circuit elements and more particularly to a high voltage resistor assembly which may be subjected to both very high steady state and transient potentials without being damaged.

The invention was designed for use in a voltage divider circuit where measurement of a high voltage is facilitated by connecting a plurality of high ohmage resistors together in series across the high voltage. The fraction of the total voltage developed across one of the resistors is then readily detected with a conventional voltmeter. However, the invention will also be found equally applicable with any high ohmage resistor utilized in a high voltage circuit where very intense electric fields occur.

Since high voltage apparatus generally can provide only a very limited current, metering resistors must have very high resistance to avoid loading the apparatus by excessive current consumption. However, high precision, high ohmage resistance material is expensive and therefore it is desired that the wattage rating be as low as possible to avoid excessive cost, since more resistance material is required in high wattage resistors. Low wattage resistors are further advantageous because of their small size, the bulk and weight of the metering apparatus thus being minimized.

There are two general types of voltage conditions that cause problems when high voltage resistors are being utilized, specifically, steady state voltages and rapidly changing transient voltages. The steady state voltage condition may cause non-uniform electric fields to form in which high voltage gradients on the resistive material promote eventual destruction of the resistor by arcing, corona, or ionic corrosion. Further, when conventional series connected resistors are used as metering resistors across a high voltage source under steady state conditions, corona losses to nearby components, framework, etc. will cause inaccuracies in the meter reading since some of the current is shunted around some of the series resistors through parallel paths. In such an instance, not all the resistors will be carrying the same quantity of current and therefore the voltage reading across one resistor will not provide a reliable indication of the total potential. After a period of time, the accuracy of the voltage reading is further degraded by the progressively greater damage to the resistors caused by corona, the surface of the resistors becoming eroded and causing changes in the resistance value. Accordingly it has been the prior practice to eliminate the corona discharge by providing an individual cylindrical shield around each resistor the shield being electrically connected to one end of the resistor. Such shield has a significantly larger radius than the resistor and has a smoother surface so that a corona discharge does not ordinarily occur.

For economy, the wattage rating of the high ohmage resistors is preferably chosen to withstand only the low steady state current, however transient currents through parts of the resistor are frequently many times greater than the steady state value. Since an occasional transient will occur in any high voltage system intended for steady state operation it is necessary that the resistors be provided with a corona shield to function accurately under steady state condition yet not be damaged by transient overloads.

Such conventional corona shields are very advantageous under steady state voltage conditions but are the cause of other serious problems when a transient step voltage is applied across a resistor. Owing to the various stray capacitances introduced by the shield and other structure, very high local electric fields occur across a small portion of a resistor, causing excessive heating and altering the resistance value or destroying the resistor. With a corona shield disposed around a resistor, the voltage gradient for a transient potential (Vap) applied across the resistor decreases exponentially from the end of the resistor not connected to the corona shield toward the end connected to the corona shield by:

$$\frac{dV}{dx} = -Vap\sqrt{Rj\omega C_d} \cdot e^{-\sqrt{Rj\omega C_d} \cdot X}$$

Where:
$X$=distance along resistor starting from the end not connected to the shield.
$\omega$=a factor dependent upon the rise time of the step voltage (Vap).
$C_d$=distributed capacitance between the corona shield and the resistor.

From the above, it is seen that nearly the entire transient potential Vap will appear across a small portion of the resistor at the end not connected to the corona shield. The conventional solution to such a situation is to reduce the voltage gradient to a minimum, the distributed capacitance ($C_d$) being made as low as possible by providing a large diameter corona shield and a filler material of low dielectric constant. The other factors indicated in the equation can not ordinarily be controlled. However, in the present invention, an additional "buffer" resistor is provided to absorb the high voltage gradient.

High voltage resistor design is further complicated by the fact that a transient potential occurring across many resistors in series tends to divide according to the stray series capacitances, and thus the entire potential may momentarily develop entirely across one resistor or group of resistors while there is very little potential drop across the remainder. A plurality of series connected resistors may be considered as a long transmission line made of a large number of resistances (R) connected in series, of parallel capacitances ($C_p$) in parallel with each resistor, and of stray capacitances ($C_s$) from each resistor to a ground plane. With the application of a step of voltage (Vap) to a first end of the transmission line, the initial voltage division can be determined by considering only the capacitances and neglecting the resistance. If the stray capacitances are considered to be uniformly distributed, the voltage ($V_{x_1}$) across the first resistance is:

$$V_{x_1} = Vap\sqrt{\frac{C_s}{C_p}}$$

If, for example, the stray capacitances ($C_s$) are 1/36 the value of the parallel capacitance ($C_p$), then 1/6 of the applied voltage will appear across the first section. Therefore, the ratio of $C_s/C_p$ should be very small to avoid excessive voltages across the first resistance. In the worst case, nearly the entire transient potential may be concentrated across a small portion of a single resistor.

While the stray capacitance ($C_s$) is difficult to adjust, the parallel capacitance ($C_p$) is controlled in the present invention by providing for a known parallel capacitance by a novel resistor corona shield arrangement. Thus, the present invention provides means for distributing the transient potential approximately equally across all the resistors and for limiting the maximum voltage gradient which can occur across an incremental part of a resistor.

The present invention provides a novel arrangement of multiple coaxial shields by which corona shielding can be provided around a voltage divider but with protection from momentary overloads by shunting transient currents through shielding that in effect constitutes a series of capacitors connected in parallel with the resistors. When a transient voltage impulse occurs, the high resulting current which is shunted around the high ohmage resistors is dissipated in low ohmage, high wattage resistors which are alternated with the high ohmage resistors in series therewith and which can withstand the high currents. Such dissipation is necessary to avoid damage to the high ohmage resistors. The low ohmage resistors are made from less expensive material than the high ohmage resistors. Since the low ohmage resistors constitute a small percentage of the total resistance precise resistance values are not required for the low ohmage resistors.

Therefore it is an object of the present invention to provide a highly accurate, reliable and durable high voltage resistance assembly.

It is another object of the present invention to provide a new means for suppressing corona discharge for high voltage resistors under both transient and steady state conditions.

It is another object of the present invention to provide protection for high voltage resistors from transient overloads which are several times higher than the maximum power dissipation rating of the resistors.

It is another object of the present invention to improve the accuracy of high voltage measurements made with high resistance metering resistors by avoiding corona current leakage.

It is another object of the present invention to lower the cost of measuring high voltages by allowing low wattage metering resistances to be utilized without undue risk of damage to the resistances from high voltage overload or corona.

Figure 4:
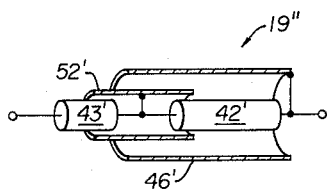
Figure 2:
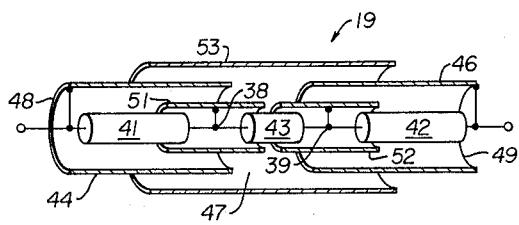
Figure 3:
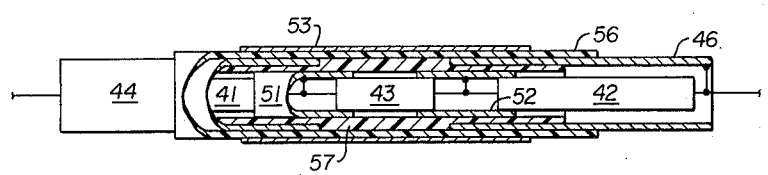

The invention will be better understood by reference to the accompanying drawing of which:

FIGURE 1 is a schematic view of a high voltage source and voltage divider resistor assembly showing how the invention is typically utilized, FIGURE 2 is a longitudinal section view showing schematically a preferred embodiment of a component section of the resistance assembly, FIGURE 3 is a longitudinal section view showing a suitable physical structure for the resistance assembly section which is shown schematically in FIGURE 2, and FIGURE 4 illustrates a simplified modification of a portion of the invention.

Referring now to FIGURE 1 there is shown a typical high voltage tower 11 having a base 12 which is at ground or zero electrical potential. A long insulator column 13 supports a rounded metallic electrode 14 which is charged to a very high potential by a power supply 16. Such power supply 16 may typically be a Cockroff-Walton generator, providing extremely high voltages. Such devices have various uses such as for accelerating charged nuclear particles, testing insulation, etc. Direct measurement of such high potentials is dfficult, but accurate measurements may be obtained by utilizing a voltage divider 17 comprised of a plurality of high resistance sections 19 connected in series between the electrode 14 and electrical ground. Such structure divides the total electrical potential into smaller, more easily and safely measured increments of potential difference. A voltmeter 18 is connected across the resistor section 19′ nearest to ground potential so that the potential measured by the voltmeter is reduced considerably from that of the electrode 14 and is near ground potential, providing for the safety of personnel and the convenient use of a conventional form of voltmeter. Alternately, a current measuring device may be utilized in series with the voltage divider 17 means instead of the voltmeter 18. To avoid excessive current drain in either instance, the resistance of the voltage divider 17 must be very high, since a very high voltage power supply 16 characteristically provides a very limited amount of current.

Conventionally, a shield comprised of a conductive cylinder has been disposed coaxially around each resistor and connected thereto at one end. The shields prevent corona discharge from the surfaces of the resistors to nearby objects. However, the conventional corona shield does not provide protection from transient overload potentials. When a high voltage transient potential occurs across a resistor, much of the transient current is shunted around a portion of the resistor through the stray capacitance between the resistor and the corona shield, but nearly all the transient current flows through the end of the resistor which is not connected to the corona shield. Since nearly all the damage caused by the transient current is concentrated at one end of the resistor, owing to the presence of the corona shield, heretofore it has been necessary to greatly increase the wattage rating, and thus the physical size of the resistor to withstand the voltage gradient and to dissipate the power in the transient current.

In the present invention, means are provided which allow a high precision resistor of wattage capable of carrying only the much lower steady state current to be utilized, the invention providing protection from transient current overloading. In the present invention, the transient currents are shunted around the high ohmage resistors and through a series connected, low ohmage buffer resistor which absorbs the high voltage gradient previously developed across the end of the high ohmage resistor that is not connected to the corona shield.

Referring now to FIGURE 2, there is shown a single resistance section 19 of the voltage divider 17 in FIGURE 1. Section 19, which is symmetrical about a central transverse plane, is comprised of a pair of axially aligned, high ohmage, high precision, resistors 41 and 42 connected in series with an intermediately located low ohmage resistor 43, the ends of the resistor 43 being connected at junctures 38 and 39 to the high ohmage resistors 41 and 42 respectively. A pair of cylindrical corona shields 44 and 46 are disposed coaxially around the high ohmage resistors 41 and 42 respectively with the facing ends separated by a gap 47, which is centered over the low ohmage resistor 43. The opposite, outer ends 48 and 49 respectively of the corona shields 44 and 46 are electrically connected to the corresponding ends of the high ohmage resistors 41 and 42 respectively.

As described previously, when a high voltage transient is applied across the section 19, the transient current is to flow through the corona shields via the connections at ends 48 and 49. However, since the gap 47 must be provided between the corona shields to avoid a short circuit between the ends of the section 19, a path for the transient current must be provided across such gap. To provide such a path and to prevent the transient current from being coupled to the high ohmage resistors 41 and 42 through the stray capacitance between such resistors and the corona shields 44 and 46, a pair of cylindrical inner shields 51 and 52 are provided around the junctures 38 and 39 between each end of low ohmage resistor 43 and the high ohmage resistors 41 and 42. Shields 51 and 52 extend for a short distance over the ends of both of the resistors, in radially spaced relation thereto, at each of such junctures. The inner shields 51 and 52 are each electrically connected to junctures 38 and 39 but are of lesser diameter than the corona shields 44 and 46 and are insulated therefrom, thus forming a pair of coaxial capacitors, corona shield 44 and inner shield 51 being the plates of one capacitor and corona shield 46 and inner shield 52 being the plates of the second capacitor. The capacitive connection of the above described structure provides a path for current flow across the gap 47 for transient currents, a transient potential applied at end 48, for example, flowing through corona shield 44 (in preference to the high impedance of resistor 41) through the capacitance between corona shield 44 and inner shield 51, through low ohmage resistor 43 to inner shield 52, and through corona shield 46 to second end 49. The transient currents are thereby shunted around the high ohmage resistors 41 and 42, and dissipated in low ohmage resistor 43.

Typically, the high ohmage resistors 41 and 42 each have a resistance of ten million ohms while the low ohmage resistor 43 has a resistance of ten thousand ohms. Thus, the high ohmage resistors 41 and 42 can be high precision, low wattage resistors with narrow tolerance while the low ohmage resistor 43 need not have such high precision since it constitutes a very small percentage of the total resistance. Each resistance section of the type described typically functions with applied potentials exceeding 5000 volts, the maximum potential depending upon the resistor used and, in some circumstances, the atmosphere it is used in.

As hereinbefore described, the fact that the corona shields 44 and 46 are connected to opposite ends of the series resistors 41, 42 and 43, makes it necessary to provide a gap 47 therebetween to avoid a short circuit. Since the low ohmage resistor 43 is disposed at the gap 47 between the two corona shields 44 and 46, corona emission could occur from the resistor 43 unless additional corona suppression means are provided. To provide such protection, an outer conductive cylindrical shield 53 is disposed around the corona shields 44 and 46, and is radially spaced therefrom, covering the gap 47 between the corona shields. Thus complete corona shielding is provided around the device without creating a short circuit between the ends thereof.

The outer shield 53 is capacitively coupled to corona shields 44 and 46. By utilizing such capacitance an important additional protective function is provided. Such protection is provided when a long series of such resistors as shown in FIGURE 1 is subjected to a high transient potential. Under transient conditions the voltage does not divide according to the values of the resistors but instead according to the various stray capacities along the voltage divider. Such capacities may cause the entire potential to appear across one or a few resistor sections rather than being well distributed along the entire voltage divider, thus damaging those few sections. The outer shields 53 serve to form a capacitance voltage divider so that an even distribution of potential along the divider is obtained. Thus the outer shield 53 performs the dual function of avoiding corona loss from the low ohmage resistor 43 and of aiding in evenly distributing transient potentials along the voltage divider.

Referring now to FIGURE 3 in particular, details of the physical construction of the apparatus of FIGURE 2 is shown. An insulator 56 is disposed between the outer shield 53 and the corona shields 44 and 46, such insulator 56 preferably comprising a vinyl plastic on which the conductive shield 53 is coated. The insulator 56 is then placed around shields 44 and 46 and heated to cause shrinkage of the vinyl and provide a tight physical juncture. A molded tubular insulator 57 electrically insulates the inner shields 51 and 52 from the corona shields 44 and 46.

As a variation, the operation of the present invention could also be attained by providing a special high ohmage resistor in which the end not connected to the corona shield has a lower resistance per unit length than the main body of the resistor, thereby including the function of both the high resistance and the low resistance in one unit. The same type of resistance material can be utilized throughout the resistor, since power absorbed in the low resistance portion is distributed over a much greater area than in the high resistance portion for the same current. Thus, the low resistance portion can withstand higher currents than the high resistance portion.

Certain of the advantages of the invention may be obtained by utilizing a resistance section structure which is essentially one half of the assembly as described with reference to FIGURES 2 and 3. Such a resistance section 19″ is shown in FIGURE 4 and comprises a high ohmage precision resistor 42′ in series with a relatively low ohmage resistor 43′. The gap between resistors 42′ and 43′ is spanned by a coaxial shield 52′ which overlaps the ends thereof and is radially spaced therefrom, the shield 52′ being connected to the juncture between the two resistors. An outer coaxial shield 46′ encircles resistor 42′ and overlaps a portion of inner shield 52′ to form a capacitive connection therewith. Outer shield 46′ is connected to the outer end of resistor 42′. This simplified resistance section 19″ functions to shunt excessive current around the high ohmage resistors in a manner essentially similar to that previously described but lacks the voltage dividing effect of the embodiment of FIGURES 2 and 3.

While the invention has been described with respect to a single embodiment, it will be apparent to those skilled in the art that many variations and modifications are possible without departing from the spirit and scope of the invention and thus it is not intended to limit the invention except as defined in the following claims.

What is claimed is:

1. In a high voltage resistance assembly, the combination comprising a high ohmage resistor, a low ohmage resistor connected in series therewith, a tubular corona shield disposed around said high ohmage resistor in spaced relationship therefrom, said corona shield being electrically connected to the end of said high ohmage resistor which is remote from said low ohmage resistor, and a tubular inner shield element disposed around at least a portion of said low ohmage resistor and overlapping a portion of said high ohmage resistor and projecting within said corona shield in spaced relationship therefrom to form a capacitive coupling between said corona shield and said low ohmage resistor, said tubular element being electrically connected to the junction between said resistors.

2. In a high voltage resistance assembly, the combination comprising a first high resistance and a second high resistance, a low resistance connected in series between said first and second high resistance and disposed in axial alignment therewith, a first and a second spaced apart corona shield disposed around said first and second resistances respectively and being connected thereto at the ends of said resistances which are remote from said low resistance, and a first and a second inner shield disposed around the junctures between said low resistance and said first and second high resistances respectively with each being connected to the adjacent one of said junctures, said first and second inner shields being capacitively coupled to said first and said second corona shields respectively.

3. A high voltage resistance assembly as described in claim 2, further characterized by an outer conductive shield disposed around and capacitively coupled to both said first and said second corona shields.

4. A voltage divider for connection across a high voltage source, said divider being of the class having a plurality of series connected resistance assemblies each having a first and a second terminal wherein each said assembly comprises a first and a second high resistance connected between said first and second terminals, a low resistance connected in series between said high resistances, a first and a second corona shield disposed around said first and said second high resistance respectively, each said shield having one end capacitively coupled to said low resistance and having the opposite end electrically connected to the proximal one of said first and said second terminals, said first and said second corona shields being spaced apart by a gap substantially centered over said low resistance, a third corona shield disposed around said gap and capacitively coupling said first and said second corona shields whereby a transient potential applied across said voltage divider is evenly distributed between said resistance assemblies.

5. A precision voltage divider having a plurality of series connected high resistance assemblies, each such assembly comprising a pair of high ohmage resistors, a low ohmage resistor connected in series between said high ohmage resistors, a pair of spaced apart corona shields one disposed around each of said high ohmage resistors and being electrically connected to the end of each of said resistors opposite said low ohmage resistor, a pair of inner shields disposed one each around the junctures between said low ohmage resistor and said pair of high ohmage resistors, each of said inner shields being electrically connected to the proximal one of said junctures, and an outer shield disposed around at least a portion of each of said corona shields and forming a capacitive coupling therebetween.

6. A precision voltage divider as described in claim 5 further characterized in that said low ohmage resistors have a maximum wattage rating substantially greater than the maximum wattage rating of said high ohmage resistors.

7. In a high voltage resistance assembly, the combination comprising a first and a second high ohmage resistor, a low ohmage resistor axially aligned with said first and second high ohmage resistors and connected in series therebetween at a first and second juncture respectively, a first and a second cylindrical conductive corona shield disposed coaxially around said first and second high ohmage resistors respectively and around said first and second junctures respectively, said first and second corona shields being connected to said first and second high ohmage resistors respectively at the ends thereof opposite said junctures, a first and second conductive inner shield coaxially disposed around said junctures within said first and second corona shields, said first and second inner shields being electrically connected to said first and second junctures respectively and being insulated from said corona shields, and an outer shield disposed around a portion of each of said first and second corona shields and around said junctures and said low ohmage resistor.

References Cited by the Examiner
UNITED STATES PATENTS

| | | | |
|---|---|---|---|
| 1,683,152 | 9/1928 | Biermanns | 338—64 |
| 2,518,225 | 8/1950 | Dorst | 323—94 |
| 2,724,761 | 11/1955 | Cisne | 323—74 |
| 2,786,976 | 3/1957 | Roemer | 323—74 |

LLOYD McCOLLUM, *Primary Examiner.*

A. D. PELLINEN, *Assistant Examiner.*